(12) United States Patent
Liu

(10) Patent No.: US 10,244,184 B2
(45) Date of Patent: Mar. 26, 2019

(54) METHOD AND APPARATUS FOR SHOOTING STAR TRAIL VIDEO, AND COMPUTER STORAGE MEDIUM

(71) Applicant: NUBIA TECHNOLOGY CO., LTD., Shenzhen, Guangdong (CN)

(72) Inventor: Linwen Liu, Shenzhen (CN)

(73) Assignee: NUBIA TECHNOLOGY CO., LTD., Shenzhen, Guangdong (CN)

( * ) Notice: Subject to any disclaimer, the term of this patent is extended or adjusted under 35 U.S.C. 154(b) by 314 days.

(21) Appl. No.: 15/322,631

(22) PCT Filed: Jun. 8, 2015

(86) PCT No.: PCT/CN2015/081016
§ 371 (c)(1),
(2) Date: Dec. 28, 2016

(87) PCT Pub. No.: WO2016/000515
PCT Pub. Date: Jan. 7, 2016

(65) Prior Publication Data
US 2017/0134666 A1   May 11, 2017

(30) Foreign Application Priority Data
Jul. 2, 2014   (CN) .......................... 2014 1 0312348

(51) Int. Cl.
*H04N 5/262* (2006.01)
*H04N 5/232* (2006.01)
(Continued)

(52) U.S. Cl.
CPC ........... *H04N 5/2621* (2013.01); *H04N 5/232* (2013.01); *H04N 5/2351* (2013.01);
(Continued)

(58) Field of Classification Search
CPC .. H04N 5/2621; H04N 5/232; H04N 5/23245; H04N 5/2351; H04N 5/265;
(Continued)

(56) References Cited

U.S. PATENT DOCUMENTS 5,113,493 A * 5/1992 Crosby .................. G06T 13/00
345/473
9,041,821 B2   5/2015 Kashiwagi et al.
(Continued)

FOREIGN PATENT DOCUMENTS

CN   102244722 A   11/2011
CN   103312969 A   9/2013
(Continued)

OTHER PUBLICATIONS

International Search Report in international application No. PCT/CN2015/081016, dated Aug. 26, 2015.
English Translation of the Written Opinion of the International Search Authority in international application No. PCT/CN2015/081016, dated Aug. 26, 2015.

*Primary Examiner* — Mishawn N Hunter
(74) *Attorney, Agent, or Firm* — Arent Fox LLP; Michael Fainberg

(57) ABSTRACT

A method and device for filming a Star trail video, and a computer storage medium. The method includes the steps of: after shooting begins, an image is collected via a camera every set time; a current image and a previous image are composited to generate a composite image; the composite image is captured, and the captured composite image is encoded; when shooting is ended, a video file is generated from the data of the encoded composite image.

17 Claims, 5 Drawing Sheets

(51) Int. Cl.
  *H04N 5/235* (2006.01)
  *H04N 5/265* (2006.01)
  *H04N 5/77* (2006.01)
  *H04N 5/91* (2006.01)
  *H04N 9/804* (2006.01)
  *H04N 9/82* (2006.01)

(52) U.S. Cl.
  CPC ......... *H04N 5/23245* (2013.01); *H04N 5/265* (2013.01); *H04N 5/772* (2013.01); *H04N 5/91* (2013.01); *H04N 9/8042* (2013.01); *H04N 9/8211* (2013.01)

(58) Field of Classification Search
  CPC ........ H04N 5/772; H04N 5/91; H04N 9/8042; H04N 9/8211
  See application file for complete search history.

(56) References Cited

U.S. PATENT DOCUMENTS

| | | |
|---|---|---|
| 2009/0213210 A1 | 8/2009 | Conley |
| 2013/0242121 A1 | 9/2013 | Kashiwagi et al. |
| 2014/0043504 A1* | 2/2014 | Ito .................... H04N 5/23293 |
| | | 348/239 |
| 2014/0347519 A1 | 11/2014 | Yamamoto |

FOREIGN PATENT DOCUMENTS

| | | |
|---|---|---|
| CN | 103595925 A | 2/2014 |
| CN | 103685933 A | 3/2014 |
| CN | 103797780 A | 5/2014 |
| CN | 103888683 A | 6/2014 |
| CN | 103905730 A | 7/2014 |
| CN | 104079833 A | 10/2014 |
| CN | 104104798 A | 10/2014 |

* cited by examiner

METHOD AND APPARATUS FOR SHOOTING STAR TRAIL VIDEO, AND COMPUTER STORAGE MEDIUM

CROSS-REFERENCE TO RELATED APPLICATIONS

This application is a US National Stage of International Application No. PCT/CN2015/081016, filed on Jun. 8, 2015, designating the United States and claiming the priority to Chinese Patent Application No. 201410312348.4, filed on Jul. 2, 2014, the contents of which are hereby incorporated by reference in their entirety.

TECHNICAL FIELD

The disclosure relates to the technical field of camera shooting, and in particular to a method and apparatus for shooting a Star trail video, and a computer storage medium.

BACKGROUND

Star trail shooting can shoot a running trail of a star, and is favoured by astronomers. The Star trail shooting may require an exposure time of 20-60 minutes usually, and may be implemented through a professional camera shooting apparatus which is provided with photosensitive hardware capable of supporting long time continuous exposure, for example, a single lens reflex (SLR) camera. Current Star trail shooting shoots only a picture. That is, only a static image displaying the running trail of the star is finally obtained. A dynamic video capable of displaying a running process of the star cannot be shot.

The traditional video shooting has a dark effect under the restriction of illumination during shooting at night. Specially, when a starry sky is shot, the shot starry sky is basically black due to the fact that the starry sky is very dark, and a Star trail video cannot be shot. Meanwhile, it requires a long time shooting to obtain a Star trail effect due to a low running speed of the star, and therefore a traditional video shooting method may require mass storage.

Currently, a solution capable of shooting a Star trail video has not yet been developed to meet diversified demands of a user, and the user experience is affected.

SUMMARY

The disclosure is expected to provide a method and apparatus for shooting a Star trail video, and a computer storage medium, and is intended to achieve shooting of a Star trail video, meet diversified demands of a user and improve the user experience.

An embodiment of the disclosure provides a method for shooting a Star trail video, which may include the steps as follows.

After shooting begins, an image is collected every set time by means of a camera.

A current image and a previous image are composited to generate a composite image.

The composite image is captured, and the captured composite image is encoded.

When shooting is ended, a video file is generated from data of the encoded image.

Based on the above solution, the step that the current image and the previous image are composited may include the step as follows.

The images are composited according to luminance information about the current image and the previous image.

Based on the above solution, the step that the images are composited according to the luminance information about the current image and the previous image may include the steps as follows.

It is judged whether the luminance of a pixel in the current image at the same position is greater than that of a pixel in the previous image.

If so, the pixel in the previous image at the same position is replaced with the pixel in the current image, and the images are composited accordingly.

Based on the above solution, the camera may be a front camera, and after an image is collected every set time by means of the camera, the method may further include the step as follows. The image is mirrored.

Based on the above solution, before the captured composite image is encoded, the method may further include the step as follows.

Special effect processing is performed on the captured composite image, the special effect processing including at least one of basic effect processing, filter effect processing and special scenario effect processing.

An embodiment of the disclosure also provides an apparatus for shooting a Star trail video, which may include an image collection module, an image composition module and a video generation module.

The image collection module is configured to collect, after shooting begins, an image every set time by means of a camera.

The image composition module is configured to composite a current image and a previous image to generate a composite image.

The video generation module is configured to capture a composite image, encode the captured composite image, and generate encoded image data into a video file.

Based on the above solution, the image composition module may be configured to: composite the images according to luminance information about the current image and the previous image.

Based on the above solution, the image composition module may be configured to:

judge whether the luminance of a pixel in the current image is greater than that of a pixel in the previous image at the same position; and replace, if yes, the pixel in the previous image with the pixel in the current image at the same position, and composite the images accordingly.

Based on the above solution, the apparatus for shooting a Star trail video may further include a mirroring module. The mirroring module may be configured to: judge whether the currently used camera is a front camera, and mirror, if yes, the collected image.

Based on the above solution, the apparatus for shooting a Star trail video may further include a special effect processing module. The special effect processing module may be configured to: perform special effect processing on the captured composite image, the special effect processing including at least one of basic effect processing, filter effect processing and special scenario effect processing.

An embodiment of the disclosure also provides a computer storage medium. A computer executable instruction may be stored in the computer storage medium. The computer executable instruction may be configured to execute at least one of the above methods.

The embodiment of the disclosure provides a method for shooting a Star trail video. An image is collected every set time, and a current image and a previous image are composited to generate a composite image. Long-term exposure is simulated using an image composition technology to obtain a Star trail picture (namely the composite image). Star trail pictures at different instants are encoded to finally composite a video file, thereby achieving shooting of a Star trail video. Thus, a user may shoot a video displaying a running process of a star using a shooting apparatus, or the disclosure is applied to similar application scenarios, meets diversified demands of the user, and improves the user experience. Meanwhile, since shooting and composite image encoding are performed in parallel, a generated composite image does not have to be stored. Therefore, the resultant video file obtained by shooting will not be very large and thus will not occupy too much storage space.

DETAILED DESCRIPTION

The preferred embodiments of the disclosure are elaborated below in conjunction with the drawings. It will be understood that specific embodiments described herein are only intended to explain the disclosure and are not intended to limit the disclosure.

An apparatus for shooting a Star trail video according to an embodiment of the disclosure simulates long term exposure using an image composition technology, instead of performing long-term exposure depending on image shooting hardware. Parameters such as ISO, picture quality and scenario mode are adjusted and limited in conjunction with requirements of a Star trail shooting scenario, and then are output to a hardware device, which acquires and composite images, and encode the composited image to generate a video file, thereby achieving shooting of a Star trail video. However, the disclosure is not limited to shooting of a Star trail, and is further applicable to other similar scenarios.

Figure 1:
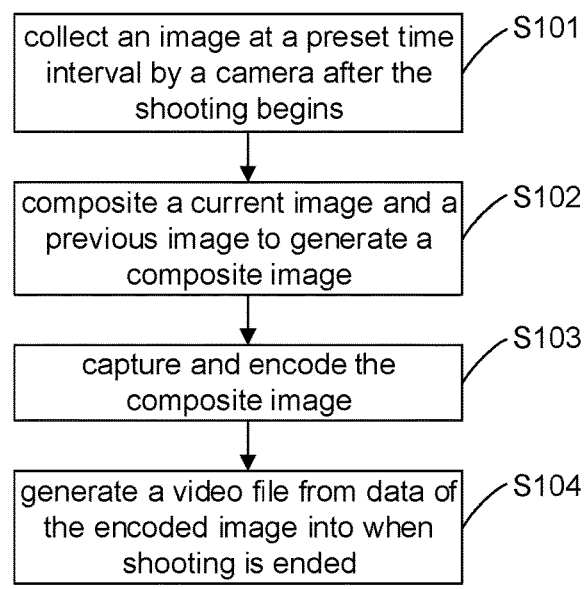
FIG. 1 is a flowchart of a first method for shooting a Star trail video according to an embodiment of the disclosure.

FIG. 1 shows a first method for shooting a Star trail video according to an embodiment of the disclosure. The method includes the following steps:

Step S101: After shooting begins, a camera collects an image every set time by means.

A Star trail video shooting mode is added to a shooting apparatus in the embodiment of the disclosure. A user may select the Star trail video shooting mode or a common shooting mode for shooting, wherein in the Star trail video shooting mode, parameters such as exposure time, ISO, resolution, exposure compensation and noise reduction are preset in conjunction with requirements of a Star trail shooting scenario, and different parameters may be preset for different starry sky scenarios over different regions for selection by the user.

When the user selects the Star trail video shooting mode, after a shooting key is pressed or a virtual shooting key is triggered, the shooting apparatus begins to shoot a Star trail, and collects an image every set time by using the camera, where the preset time interval is equivalent to exposure time ranging from 5 seconds to 10 seconds as required. The collected images may be cached in a caching module for later reading by an image composition module so as to composite the images, or the collected images may be directly sent to the image composition module so as to be composited in the subsequent step.

During starry sky shooting, a focus may be automatically set as infinity.

Step S102: A current image and a previous image are composited to generate a composite image.

The image composition module of the shooting apparatus directly receives the collected images, or reads the images from the caching module in real time, composites the images, resets the caching module to empty data therein to provide space for subsequent data. Based on the above solution, the image composition module composites the images based on luminance information of the current image and the previous image. Since the camera successively collects the images, composite images are also successively generated. The composite images are Star trail pictures actually, and the composite images generated at different instants present Star trail effects at different instants respectively.

In one embodiment, as for pixels at the same position and at different time, the image composition module judges whether the luminance of a pixel in the current image is greater than that of a pixel in the previous image, and if yes, replaces the pixel in the previous image with the pixel in the current image. After all of the pixels having smaller luminance in the previous image are replaced, a composite image is finally generated. That is, in this embodiment, the image composition is performed in a luminance selection manner, in which a composite image (previous image) is taken as a basic image, and then each pixel in the basic image having a smaller luminance than that of the corresponding pixel in the subsequent image is replaced with the latter.

For example, after a first image is shot, the first image (previous image) is taken as the basis. When a second image (current image) comes, pixels at same pixel positions of the first image and the second image are compared. each pixel in the second image having larger luminance than that in the first image at the same pixel position is selected, and latter is replaced with the former, resulting in a composite image. Then, based on this composite image, subsequent images are processed in the same way. A Star trail composite image is finally obtained.

As another example, each image includes n pixel units, namely a pixel unit 1, a pixel unit 2 to a pixel unit n, wherein the luminance of each of 200 pixels units (pixel unit 501 to pixel unit 700) in a current image is greater than that in a previous image. The image composition module replaces pixels of the pixel unit 501 to the pixel unit 700 in the previous image with pixels of the pixel unit 501 to the pixel unit 700 in the current image, so as to obtain a new image, i.e., a composite image. Such a bright spot replacement mode has the following advantage over a bright spot superposition mode: the running trail of a star can be shot more clearly, preventing the excessive luminance of bright spots near the Star trail from deteriorating the effect of the Star trail.

In addition, the image composition module further performs a noise reduction process on the composite image, and controls a composition proportion of a new composition image according to the exposure of a previous image so as to supress over-exposure.

Step S103: The composite image is captured, and the captured composite image is encoded.

Specifically, composite images may be captured successively or at an interval. Successively capturing the composite images means that: immediately after each composite image is generated, the composite image is captured and encoded. That is, all of the generated composite images are taken as materials for video composition. Generation of a composite image and capturing of a composite image for encoding are two threads performed in parallel. Since shooting and encoding of a composite image are performed in parallel, the generated composite images do not have to be stored.

Interval capturing means that some of the composite images are selectively captured as materials for video composition. An interval manner may be a manual interval mode or an automatic interval mode, where the manual interval mode refers to providing an operation interface on which the user clicks to trigger capturing of image data. For example, the user clicks on a screen to capture a currently generated composite image (namely, a current preview image in case of preview). The automatic interval mode refers to capturing a composite image every set time, that is, capturing a composite image every set time.

Interval time for capturing a composite image is preferably longer than interval time (namely, exposure time) for collecting an image by the camera, thereby avoiding capturing the same composite image for two or more times, or reducing the size of a resultant composited video file. For example, a composite image may be captured at a time interval of 1-2 minutes as a currently generated composite image, i.e., a Star trail picture at current instant. Then, the captured composite images are video-encoded in a common format of Moving Picture Experts Group (MPEG)-4, H264, H263 and VP8 etc., for subsequent generation of a video file. The details of a method for encoding the composite images are the same as the prior art, which will be omitted here.

In addition, capturing a composite image every set time may be expressed as capturing a composite image every time the camera collects a preset number of images. Despite of different expressions, they refer to the same method. For example, assuming that the camera collects an image every 10 seconds (that is, exposure time is 10 seconds), the shooting apparatus captures a composite image every time the camera collects three images. Equivalently, a composite image is captured every 3*10 s=30 s.

Step S104: When shooting is ended, a video file is generated based on the encoded image data.

A format of the generated video file may be appointed by the user. The format of the video file includes, but is not limited to, mp4, 3gp, avi, rmvb and the like.

Thus, images are collected every set time, and a current image and a previous image are composited into a composite image. Long-term exposure is simulated using an image composition technology to obtain a Star trail picture (namely the composite image). Star trail pictures at different instants are encoded and composited into a video file, thereby achieving shooting of a Star trail video. Thus, the disclosure allow a user to shoot a video showing a running process of a star using a shooting apparatus and may be applicable to similar application scenarios, so as to meet diversified demands of the user and improve the user experience. Meanwhile, since shooting and composite image encoding are performed in parallel, a generated composite image does not have to be stored. Therefore, the resultant video file will not be very large and thus will not occupy too much storage space.

Figure 2:
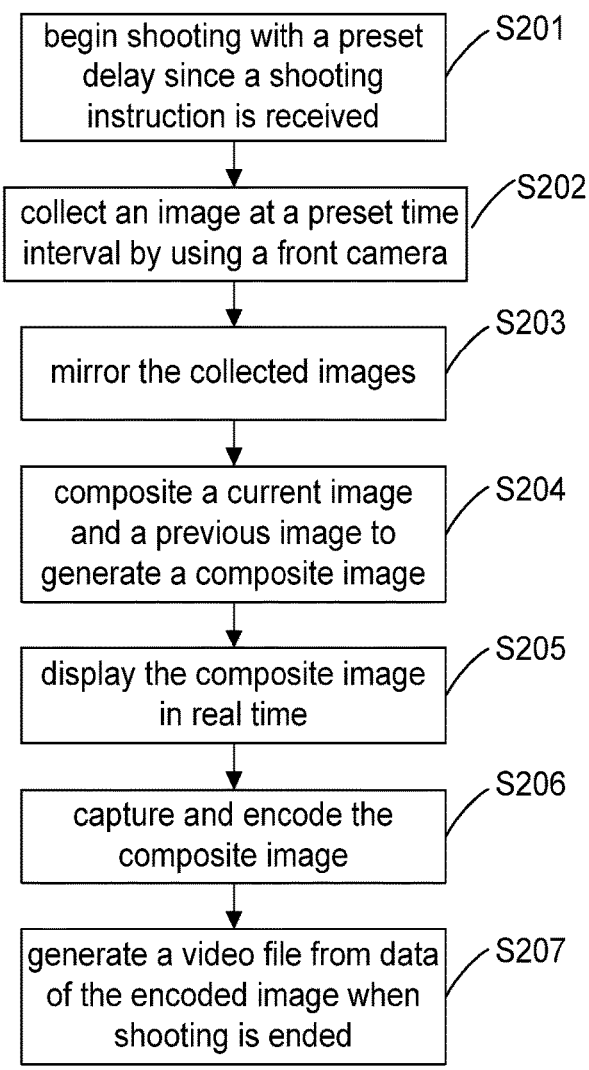
FIG. 2 is a flowchart of a second method for shooting a Star trail video according to embodiment of the disclosure.

FIG. 2 shows a second method for shooting a Star trail video according to an embodiment of the disclosure. The method includes the following steps.

Step S201: After a shooting instruction is received, the shooting is delayed for preset time before beginning.

In order to avoid influence on a shooting effect due to slight shaking generated during press-down of a shooting key, this embodiment achieves an anti-shaking function by delayed shooting. That is, an apparatus for shooting a Star trail video performs shooting with the preset delay since a user presses down the shooting key to send the shooting instruction, so as to wait for the end of the artificial shaking. Preferably, the preset delay is 1-3 s.

Step S202: An image is collected every set time using a front camera.

The camera has to face the sky when the user shoots a Star trail video. If the Star trail video is shot using a rear camera, a screen of the shooting apparatus faces down, which is extremely inconvenient for previewing by the user. In this embodiment, the screen of the shooting apparatus will face up when the Star trail video is shot using the front camera, facilitating the user to check the shooting effect. Certainly, the user may freely switch between the front camera and the rear camera as needed.

Step S203: The collected images are mirrored.

A Star trail picture captured by the front camera is in mirrored relationship with an actual picture. In view of this, after the images are collected, this embodiment mirrors the collected images, and sends the processed images to a caching module or directly sends the images to an image composition module for generating a composite image. In some embodiments, the apparatus for shooting a Star trail video may inquire whether the user needs to mirror the images, and executes a corresponding operation according to the selection of the user.

Step S204: The current image and the previous image are composited to generate a composite image.

Step S205: The composite image is displayed in real time.

The shooting apparatus displays the composite image on a display screen in real time to allow the user to preview a current Star trail effect in real time. In order to achieve a fluency preview effect, the composite image displayed by the shooting apparatus is a small-sized compressed thumbnail, and full-sized images are stored. That is, display and storage are two separate threads.

The collected images are mirrored in advance. In this case, the displayed composite image will be completely consistent with an actual Star trail picture without further processing by the user. It will be convenient for the user to check a Star trail shooting effect due to that the screen faces up during shooting.

In some embodiments, in case of shooting by using the front camera, a composite image may be mirrored after being generated, and then the processed composite image is displayed in real time.

Step S206: The composite image is captured, and the captured composite image is encoded.

Since the screen faces up, the user may conveniently check a preview effect of a composite image. Therefore, the user more conveniently captures a currently previewed composite image using a manual interval mode. A manual interval mode preference function may be set. Even though an automatic interval mode is currently set, if the user selects a composite image, which is exactly out of an automatic interval capturing range, on a current preview interface in the shooting process, the user may manually capture the composite image. For example, the user clicks on or slides the screen to capture the currently displayed composite image.

Step S207: When shooting is ended, a video file is generated from encoded image data.

Thus, an anti-shaking effect is achieved by delayed shooting. During shooting via the front camera, the display screen faces up, and in the shooting process, the user may conveniently preview a shooting effect in real time, and may conveniently perform manual interval capturing, so as to generate a satisfying Star trail video effect, thereby further improving the user experience.

Optionally, for the above two embodiments, in order to make the user more interested in shooting, before the captured composite images are encoded, special effect processing is performed on the captured composite images, the special effect processing including at least one of basic effect processing, filter effect processing and special scenario effect processing, where the basic effect process may include noise reduction processing, luminance processing, chrominance processing and the like; the filter effect process may include drawing processing, negative processing, black-white processing and the like; and the special scenario effect process may include common weather processing, starry sky processing and the like.

Optionally, in order to enable the user to perform sound recording when video is being recorded, in parallel to capturing and encoding the composite images, the following processing may be performed: turning on an audio device to receive audio data; and encoding the audio data. The audio data may be collected by a microphone or may be from a custom audio file. When the audio data is from the custom audio file, an audio file is decoded firstly to obtain original audio data. Based on the above solution, the audio data may be further subject to special effect processing before being encoded, the special effect processing including special effect recording, sound change, tone change and/or speed change.

In case of adding an audio recording function, a video file may be generated as follows. In accordance with a shooting ending instruction of the user, the video file in a format set by the user is generated from encoded image data and encoded audio data.

To facilitate the operation of the user, an operation interface may be provided for the user and configured to set a mode (interval capturing or continuous capturing) of capturing the composite images, interval time for interval capturing, whether to perform the special effect processing, and whether to enable an audio recording function.

According to this embodiment, in practical application, while the composite images captured at intervals are encoded, non-captured composite images may not be stored, in order to save the storage space of the shooting apparatus.

Figure 3:
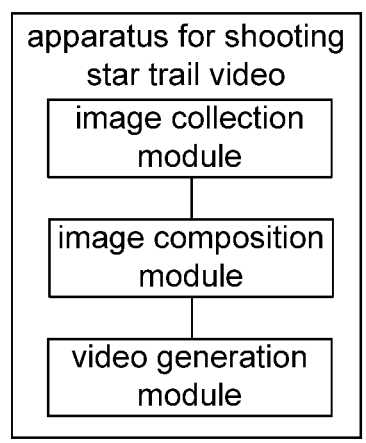
FIG. 3 is a structural diagram of a first apparatus for shooting a Star trail video according to an embodiment of the disclosure.

FIG. 3 shows a first embodiment of an apparatus for shooting a Star trail video according to the disclosure. The apparatus for shooting a Star trail video may be a common digital camera such as card camera, or may be a terminal device with a photographic function enabled, such as a mobile phone and a tablet computer. The apparatus for shooting a Star trail video may include an image collection module, an image composition module and a video generation module.

The image collection module is configured to call a camera to collect an image.

A Star trail video shooting mode is added in the embodiment of the disclosure. A user may select the Star trail video shooting mode or a common mode for shooting. When the user selects the Star trail video shooting mode, the Star trail video shooting will be initiated after a shooting key is pressed down or a virtual shooting key is triggered. The image collection module calls the camera to collect an image every set time, the preset time being equivalent to an exposure time of 5-10 seconds optionally. During starry sky shooting, the image collection module may automatically set a focus of the camera to be infinity.

The Star trail video shooting mode in the embodiment of the disclosure presets parameters such as exposure time, ISO, resolution, exposure compensation and noise reduction in conjunction with requirements of a Star trail shooting scenario, and may also preset different parameters depending on different starry sky scenarios over different regions for selection operation of the user during shooting. During shooting, the parameters are output to a relevant hardware device such as the image collection module, so as to sample or pre-process the collected images according to the set parameters.

Subsequently, the image collection module sends the collected images to the image composition module. In some embodiments, the apparatus for shooting a Star trail video may further include a caching module. The image collection module stores the collected images in the caching module, and later the image composition module directly reads image information from the caching module.

The image composition module is configured to composite the current image and the previous image to generate a composite image. Based on the above solution, the images are composited based on luminance information of the current image and the previous image. Since the camera successively collects the images, composite images are also successively generated.

In one preferred embodiment, as for pixels at the same position and at different time, the image composition module judges whether the luminance of a pixel in the current image is greater than that of a pixel in the previous image, and if yes, replaces the pixel in the previous image with the pixel in the current image. After all of the pixels having smaller luminance in the previous image are replaced, a composite image is finally composited. That is, the image composition of this embodiment is performed in a luminance selection mode. An image (previous image) that has been composited is taken as a basic image, and pixels of a subsequent image having luminance larger than that of pixels of the basic image at same pixel positions are selected for replacing.

For example, after a first image is shot, the first image (previous image) is taken as a basis. When a second image (current image) comes, each of pixels of the first image is compared with a pixel of the second image at a corresponding position. If the luminance of the second image is larger than that of the first image, a pixel of the second image is extracted to replace a pixel at the corresponding position of the first image, so as to generate a composite image. Then, based on this composite image, a subsequent image is processed in the same way and so on. A Star trail chart is finally obtained.

As another example, each image includes n pixel units namely a pixel unit 1, a pixel unit 2 to a pixel unit n, wherein the luminance of each of 200 pixel units from pixel unit 501 to pixel unit 700 of a current image is greater than that of a previous image. The image composition module replaces pixels of the pixel unit 501 to the pixel unit 700 in the previous image with pixels of the pixel unit 501 to the pixel unit 700 in the current image, so as to obtain a new image i.e., a composite image. This bright spot replacement mode may have the following advantage over a bright spot superposition mode: the running trail of a star can be shot more clearly, preventing the excessive luminance of bright spots near the Star trail from deteriorating the effect of the Star trail.

The image composition module may further display the generated composite images in real time by a display screen, and may cache each composite image.

In order to achieve a fluent preview effect, the image composition module compresses the composite images into small-sized thumbnails, and then displays the composite images on the display screen.

The video generation module is configured to capture and encode the composite image, and generate data of the encoded composite image into a video file.

Optionally, the video generation module may capture composite images successively or at an interval. Successively capturing the composite images means that: immediately after each composite image is generated, the composite image is captured and encoded, that is, all of the generated composite images are taken as materials for video composition. Generation of a composite image and capturing of a composite image for encoding are two threads performed in parallel.

Interval capturing means that some of the composite images are selectively captured as materials for video composition. An interval manner may be a manual interval mode or an automatic interval mode, where the manual interval mode means that the video generation module provides an operation interface on which the user clicks to trigger capturing of image data. For example, the user clicks on a screen to capture a currently generated composite image (namely, a current preview image in case of preview) by the video generation module. The automatic interval mode means that the video generation module captures composite images every set time, i.e., captures a composite image every set time.

Interval time for capturing a composite image is preferably longer than interval time (i.e., exposure time) for collecting an image by the camera, thereby avoiding capturing of the same composite image for two or more times. For example, a composite image is captured every 10 seconds to 1 minutes, the composite image is a currently generated composite image. Then, the video generation module video-encodes the captured composite images into video codes in a common format such as MPEG-4, H264, H263 and VP8, for subsequent generation of a video file. The details of a method for encoding the composite images are the same as the prior art, which will be omitted here.

In addition, capturing a composite image every set time may be expressed as capturing a composite image every time the camera collects a preset number of images. Despite of different expressions, they refer to the same method. For example, assuming that the camera collects an image every 10 seconds (that is, exposure time is 10 seconds), the shooting apparatus captures a composite image every time the camera collects three images. Equivalently, a composite image is captured every 3*10 seconds=30 seconds.

The video generation module may generate a video file in a video file format appointed by the user from data of the encoded composite image. The video file format may include, but is not limited to, mp4, 3gp, avi, rmvb and the like.

According to this embodiment, in practical application, while the composite images captured at intervals are encoded, non-captured composite images may not be stored, in order to save the storage space.

Figure 4:
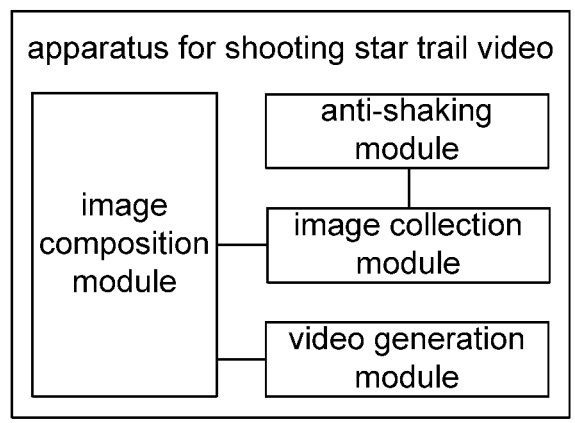
FIG. 4 is a structural diagram of a second apparatus for shooting a Star trail video according to an embodiment of the disclosure.

In a second embodiment shown in FIG. 4, the apparatus for shooting a Star trail video also has an anti-shaking function during Star trail shooting. The second embodiment differs from the first embodiment in that, the second embodiment is additionally provided with an anti-shaking module. The anti-shaking module is connected to the image collection module. The anti-shaking module is configured to receive a shooting instruction, and send the shooting instruction to the image collection module with a preset delay. The image collection module begins to collect images upon receiving the shooting instruction. That is, an apparatus for shooting a Star trail video performs shooting with the preset delay after a user presses down the shooting key to send the shooting instruction, to wait for the end of the artificial shaking. Preferably, the preset delay is 1-3 seconds.

Thus, the anti-shaking function is achieved by delayed shooting, and may prevent a shooting effect from the influence of slight shaking generated during press-down of the shooting key, further improving the shooting experience of the user.

Figure 5:
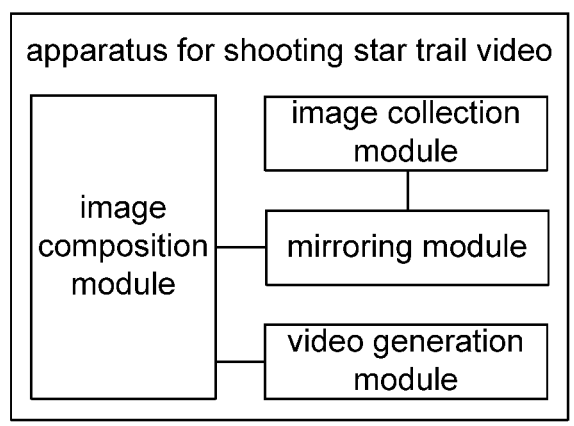
FIG. 5 is a structural diagram of a third apparatus for shooting a Star trail video according to an embodiment of the disclosure.

FIG. 5 shows a third embodiment for an apparatus for shooting a Star trail video according to the disclosure. The third embodiment differs from the first embodiment in that the third embodiment is additionally provided with a mirroring module, where the image collection module, the mirroring module and the image composition module are connected in sequence. The mirroring module is configured to: judge whether a currently used camera is a front camera; if yes, mirror a collected image, and transmit the processed image to the image composition module; and if no, directly transmit the image as it is to the image composition module without any processing.

During Star trail shooting, the apparatus for shooting a Star trail video of this embodiment allows the user to freely switch between the front camera and a rear camera. A Star trail picture captured by the front camera is in mirrored relationship with an actual picture. Therefore, after the images are collected using the front camera, this embodiment mirrors the collected images using the mirroring module, and then sends the processed images to the caching module or directly sends the images to the image composition module to allow the image composition module to generate a composite image. In this case, the generated composite image will be completely consistent with an actual Star trail picture, and the user does not have to perform subsequent processing. When the user shoots a Star trail, a camera has to face the sky. If the Star trail video is shot using the rear camera, a screen will face down, and it is extremely inconvenient for the user's preview. When the Star trail video is shot using the front camera, the screen faces up, and the user may conveniently check the shooting effect.

In some embodiments, the mirroring module may be connected to the image composition module and the video generation module separately. After determining that the currently used camera is the front camera, the composite image generated by the image composition module is mirrored, and then the processed composite image is displayed in real time.

In some embodiments, the mirroring module may be connected to only the video generation module. The video generation module sends the captured composite image to the mirroring module for mirroring, and the mirroring module returns the processed composite image to the video generation module for encoding.

In some embodiments, the mirroring module may directly inquire whether the user needs to mirror the images, and if yes, the collected image or composite image is mirrored.

Figure 6:
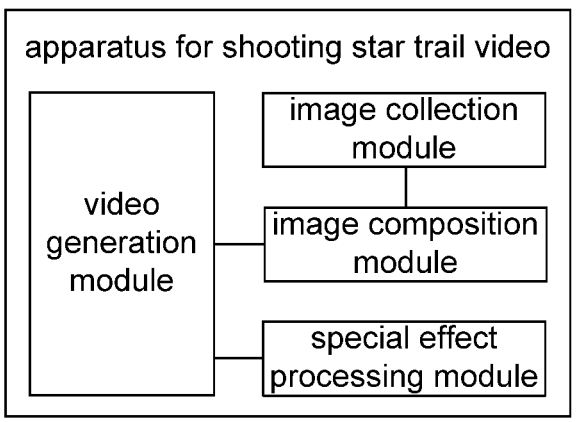
FIG. 6 is a structural diagram of a fourth apparatus for shooting a Star trail video according to an embodiment of the disclosure.

FIG. 6 shows a fourth embodiment for an apparatus for shooting a Star trail video according to the disclosure. The fourth embodiment differs from the first embodiment in that the fourth embodiment is provided with a special effect processing module, which is connected to the video generation module. The video generation module sends the captured composite image to the special effect processing module. The special effect processing module performs special effect processing on the captured composite image, and then returns the processed composite image to the video generation module for encoding.

The special effect processing may include basic effect processing, filter effect processing and/or special scenario effect processing, where the basic effect processing may include noise reduction processing, luminance processing, chrominance processing and the like; the filter effect processing may include drawing processing, negative processing, black-white processing and the like; and the special scenario effect processing may include common weather processing, starry sky processing and the like.

Based on the above solution, the video generation module is further configured to: turn on an audio device to receive audio data; and encode the audio data. The audio data may be collected by a microphone or may be from a custom audio file. When the audio data is from the custom audio file, the video generation module may firstly decode the audio file to obtain original audio data. Based on the above solution, before the audio data is encoded, the special effect processing module may further perform special effect processing on the audio data, the special effect processing including at least one of special effect recording, sound change, tone change and speed change. At last, in accordance with a shooting ending instruction of the user, the video generation module may generate the video file in a format set by the user, based on the encoded image data and the encoded audio data.

The apparatus and method for shooting a Star trail video according to the embodiments of the disclosure may be applicable to other similar application scenarios, in addition to Star trail shooting.

Thus, the apparatus for shooting a Star trail video according to the disclosure collects an image every set time and composites a current image and a previous image to generate a composite image. Long-term exposure is simulated using an image composition technology to obtain a Star trail picture, i.e., the composite image. Star trail pictures at different instants are encoded and composited into a video file, thereby achieving shooting of a Star trail video. Thus, the disclosure allows a user to shoot a video showing a running process of a star using a shooting apparatus and may be applicable to similar application scenarios, so as to meet diversified demands of the user and improve the user experience. Meanwhile, since shooting and composite image encoding are performed in parallel, the generated composite image does not have to be stored. Therefore, the resultant video file will not be very large and thus will not occupy too much storage space.

Furthermore, an anti-shaking effect is achieved by delayed shooting. During shooting via the front camera, the display screen faces up, and in the shooting process, the user may conveniently check a shooting effect in real time, and may conveniently perform manual interval capturing, so as to generate a satisfying Star trail video effect, thereby further improving the user experience.

It is to be noted that, for Star trail video shooting of the apparatus for shooting a Star trail video provided by the above embodiment, the division of all the functional modules is exemplary and not limited thereto, and may vary as required in practice. In addition, the embodiments of the apparatus for shooting a Star trail video and the embodiments of the method for shooting a Star trail video belong to a same concept. The embodiments of the method may be referred to, for the details of implementing the apparatus, which will be omitted here.

An embodiment of the disclosure also provides a computer storage medium in which a computer executable instruction is stored. The computer executable instruction may be configured to execute at least one of the methods for shooting a Star trail video as shown in FIG. 1 and/or FIG. 2 and/or FIG. 3.

The computer storage medium may be various types of storage media such as a Read-Only Memory (ROM)/Random Access Memory (RAM), a magnetic disk, an optical disk, a Digital versatile Disk (DVD) or a U disk. The computer storage medium in this embodiment may be optionally a non-instantaneous storage medium.

It is to be noted that in the apparatus for shooting a Star trail video in the embodiment of the disclosure, the image collection module, the image composition module and the video generation module may correspond to various structures capable of executing the above functions such as various types of processors having an information processing function. Each processor may include information processing structures or chips such as an Application Processor (AP), a Central Processing Unit (CPU), a Digital Signal Processor (DSP) or a Field Programmable Gate Array (FPGA). The processors may achieve the above functions by executing appointed codes.

Figure 7:
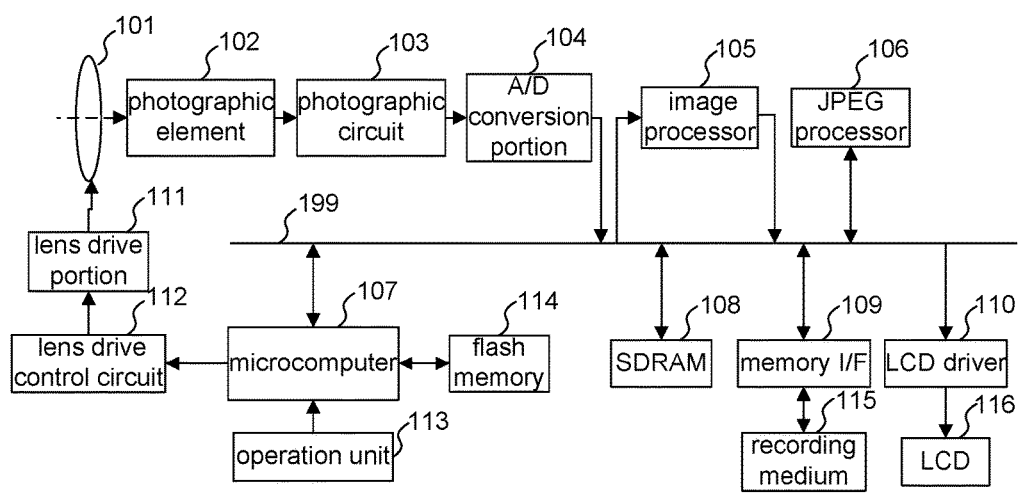
FIG. 7 is an electrical structure diagram of an apparatus for shooting a Star trail video according to an embodiment of the disclosure.

FIG. 7 is a block diagram showing a main electrical structure of a camera according to one embodiment of the disclosure. A photographic lens 101 is composed of a plurality of optical lenses for forming an image of a to-be-photographed object, and may be a single focus lens or a zoom lens. The photographic lens 101 can move along an optical axis direction by means of a lens drive portion 111, a focus position of the photographic lens 101 is controlled according to a control signal from a lens drive control portion 112, and a focus distance is controlled under the condition of the zoom lens. The lens drive control portion 112 performs drive control on the lens drive portion 111 according to a control command from a microcomputer 107.

A photographic element 102 is configured near a position where the photographic lens 101 forms the image of the to-be-photographed object, on an optical axis of the photographic lens 101. The photographic element 102 functions as a photographic portion for photographing the object and obtaining photographic image data. Two-dimensional (2D) matrix of photoelectric diodes is provided on the photographic element 102, and each of the photoelectric diodes corresponds to one pixel. Each photoelectric diode generates a photoelectric conversion current corresponding to a light interception quantity, and a capacitor connected to the photoelectric diode may accumulate charge from the photoelectric conversion current. A front surface of each pixel is configured with RGB colour filters in the Bayer arrangement.

The photographic element 102 is connected to a photographic circuit 103. The photographic circuit 103 performs charge accumulation control and image signal read-out control in the photographic element 102, performs reset noise reduction, wave shaping and gain boost for a read-out image signal (analogue image signal) so as to form an appropriate signal level.

The photographic circuit 103 is connected to an Analogue-to-Digital (A/D) conversion portion 104. The A/D conversion portion 104 performs A/D conversion on the analogue image signal, and outputs a digital image signal (hereinafter referred to as image data) to a bus 199.

The bus 199 is a transmission path for transmitting various data read out or generated inside the camera. In addition to the A/D conversion portion 104, the bus 199 is also connected to an image processor 105, a Joint Photographic Experts Group (JPEG) processor 106, a microcomputer 107, a Synchronous Dynamic Random Access Memory (SDRAM) 108, a memory interface (hereinafter referred to as memory I/F) 109 and a Liquid Crystal Display (LCD) driver 110.

The image processor 105 performs various types of image processing such as OB subtraction processing, white balance adjustment, colour matrix operation, gamma conversion, colour difference signal processing, noise removal processing, synchronization processing and edge processing on the image data output by the photographic element 102. The JPEG processor 106 compresses the image data read out from the SDRAM 108 according to a JPEG compression mode, when recording the image data into a recording medium 115. Furthermore, the JPEG processor 106 decompresses JPEG image data in order to reproduce image to be displayed. When the decompression is being performed, a file recorded in the recording medium 115 is being read out. After the decompression at the JPEG processor 106, the decompressed image data is temporarily stored in the SDRAM 108 and is displayed on the LCD 116. The image compression/decompression mode is the JPEG mode in this embodiment, but is not limited thereto. Certainly, other compression/decompression modes such as an MPEG, a Tagged Image File Format (TIFF) and H.264 may be adopted.

An operation unit 113 includes, but is not limited to, physical keys or virtual keys. The physical or virtual keys may be operation members such as various input buttons and various input keys including a power button, a photographic key, an edit key, a dynamic image button, a reproduction button, a menu button, a cross key, an OK button, a deletion button and an amplification button, and operation states of these operation members are detected.

A detection result is output to the microcomputer 107. In addition, a touch panel is disposed on a front surface of the LCD 116 serving as a display portion, to detect a touch position of the user and output the touch position to the microcomputer 107. The microcomputer 107 executes various processing sequences corresponding to the operation of the user according to a detection result from the operation members of the operation unit 113. Alternatively, the computer 107 may execute various processing sequences corresponding to the operation of the user according to the detection result of the touch panel on the front surface of the LCD 116.

A flash memory 114 stores a program for executing various processing sequences of the microcomputer 107. The microcomputer 107 performs integral control of the camera according to the program. In addition, the flash memory 114 stores various adjustment values of the camera, and the microcomputer 107 reads out the adjustment values and controls the camera according to the adjustment values. The SDRAM 108 is an electrically-alterable volatile memory for temporarily storing image data and the like. The SDRAM 108 temporarily stores image data output from the A/D conversion portion 104 and image data processed in the image processor 105, the JPEG processor 106 and the like.

The microcomputer 107 functions as a control portion for the whole camera, and controls various processing sequences of the camera in a centralized manner. The microcomputer 107 is connected to the operation unit 113 and the flash memory 114.

The microcomputer 107 may control the apparatus in this embodiment by means of an execution program to execute the following operations:

collecting, after shooting begins, an image every set time by means of a camera;

compositing a current image and a previous image to generate a composite image;

capturing the composite image, and encoding the captured composite image; and generating a video file from data of the encoded composite image, when shooting is ended.

Optionally, compositing the current image and the previous image may include:

compositing the images based on luminance information of the current image and the previous image.

Optionally, compositing the images according to the luminance information of the current image and the previous image may include: judging whether the luminance of a pixel in the current image is greater than that of a pixel in the previous image at the same position; and if yes, replacing the pixel in the previous image at the same position with the pixel in the current image, and compositing the images accordingly.

Optionally, the camera is a front camera, and after the image is collected every set time by means of the camera, the operation may further include: mirroring the images.

Optionally, before the captured composite image is encoded, the operation may further include performing special effect processing on the captured composite image, special effect processing including at least one of basic effect processing, filter effect processing and special scenario effect processing.

The memory UF 109 is connected to the recording medium 115, so as to control writing of image data and data such as a file header added to the image data into the recording medium 115 and reading of the data from the recording medium 115. The recording medium 115 may be, for example, a recording medium such as a memory card removably mounted on a camera body. However, the recording medium 115 is not limited thereto, and may be a hard disk and the like built in the camera body.

The LCD driver 110 is connected to the LCD 116. The image data processed by the image processor 105 is stored in the SDRAM. When displaying is needed, the image data stored by the SDRAM is read and displayed on the LCD 116. Or, image data compressed by the JPEG processor 106 is stored in the SDRAM. When displaying is needed, the JPEG processor 106 reads the image data compressed by the SDRAM, decompresses the image data, and displays the decompressed image data by the LCD 116.

The LCD 116 may be provided on a back surface of the camera body to display an image. The LCD 116 is provided with a touch panel for detecting a touch operation of the user. In addition, the display portion is a liquid crystal display panel (LCD 116), but is not limited thereto, and may be various display panels such as an organic EL.

Those skilled in the art will appreciate that all or some of the steps in the above embodiment of the method may be implemented by controlling relevant hardware via programs, and the programs may be stored in a computer readable storage medium, for example, an ROM/RAM, a magnetic disk or an optical disk.

The preferred embodiments of the disclosure have been described and are not intended to limit the disclosure. Any modifications made in accordance with the principle of the disclosure may fall within the protection scope of the disclosure.

What is claimed is:

1. A method for shooting a Star trail video, comprising: collecting, after shooting begins, an image every set time by means of a camera; for each new collected image, compositing the new collected image and a previous composite image to generate a new composite image; capturing at least some of the composite images, and encoding the captured composite images; and generating a video file from data of the encoded composite images, when shooting is ended; wherein compositing the new collected image and the previous composite image comprises: compositing the images based on luminance information of the new collected image and the previous composite image.

2. The method for shooting the Star trail video according to claim 1, wherein compositing the images based on the luminance information of the new collected image and the previous composite image comprises: judging whether luminance of a pixel in the new collected image is greater than that of a pixel in the previous composite image at a same position; and if yes, replacing the pixel in the previous composite image with the pixel in the new collected image at the same position.

3. The method for shooting the Star trail video according to claim 2, wherein the camera is a front camera, and after an image is collected every set time by means of the camera, the method further comprises: mirroring the image.

4. The method for shooting the Star trail video according to claim 2, wherein before the captured composite images are encoded, the method further comprises: performing special effect processing on the captured composite images, the special effect processing comprising at least one of basic effect processing, filter effect processing and special scenario effect processing.

5. The method for shooting the Star trail video according to claim 1, wherein the camera is a front camera, and after an image is collected every set time by means of the camera, the method further comprises: mirroring the image.

6. The method for shooting the Star trail video according to claim 1, wherein before the captured composite images are encoded, the method further comprises: performing special effect processing on the captured composite images, the special effect processing comprising at least one of basic effect processing, filter effect processing and special scenario effect processing.

7. The method for shooting the Star trail video according to claim 1, wherein the camera is a front camera, and after an image is collected every set time by means of the camera, the method further comprises: mirroring the image.

8. The method for shooting the Star trail video according to claim 1, wherein before the captured composite images are encoded, the method further comprises: performing special effect processing on the captured composite images, the special effect processing comprising at least one of basic effect processing, filter effect processing and special scenario effect processing.

9. An apparatus for shooting a Star trail video, comprising an image collection module, an image composition module and a video generation module, wherein the image collection module is configured to collect, after shooting begins, an image every set time by means of a camera; the image composition module is configured to, for each new collected image, composite the new collected image and a previous composite image to generate a new composite image; and the video generation module is configured to capture at least some of the composite images, encode the captured composite images, and generate a video file from data of the encoded composite image; wherein compositing the new collected image and the previous composite image comprises: compositing the images based on luminance information of the new collected image and the previous composite image.

10. The apparatus for shooting the Star trail video according to claim 9, wherein the image composition module is configured to: judge whether luminance of a pixel in the new collected image is greater than that of a pixel in the previous composite image at a same position; and if yes, replace the pixel in the previous composite image with the pixel in the new collected image at the same position.

11. The apparatus for shooting the Star trail video according to claim 9, further comprising a mirroring module which is configured to: judge whether the currently used camera is a front camera, and if yes, mirror the collected images.

12. The apparatus for shooting the Star trail video according to claim 9, further comprising a special effect processing module, wherein the special effect processing module is configured to: perform special effect processing on the captured composite image, the special effect processing comprising at least one of basic effect processing, filter effect processing and special scenario effect processing.

13. The apparatus for shooting the Star trail video according to claim 9, further comprising a mirroring module which is configured to: judge whether the currently used camera is a front camera, and if yes, mirror the collected images.

14. A non-transitory computer storage medium, storing computer executable instructions for executing a method for shooting Star trail video, including instructions for: collecting, after shooting begins, an image every set time by means of a camera; for each new collected image, compositing the new collected image and a previous composite image to generate a new composite image; capturing at least some of the composite images, and encoding the captured composite images; and generating a video file from data of the encoded composite images, when shooting is ended; wherein compositing the new collected image and the previous composite image comprises: compositing the images based on luminance information of the new collected image and the previous composite image.

15. The non-transitory computer storage medium according to claim 14, wherein compositing the images based on the luminance information of the new collected image and the previous composite image comprises: judging whether luminance of a pixel in the new collected image is greater than that of a pixel in the previous composite image at a same position; and if yes, replacing the pixel in the previous composite image with the pixel in the new collected image at the same position.

16. The non-transitory computer storage medium according to claim 14, wherein the camera is a front camera, and after an image is collected every set time by means of the camera, the method further comprises: mirroring the image.

17. The non-transitory computer storage medium according to claim 14, wherein before the captured composite images are encoded, the method further comprises: performing special effect processing on the captured composite images, the special effect processing comprising at least one of basic effect processing, filter effect processing and special scenario effect processing.

* * * * *